United States Patent [19]
Long et al.

[11] Patent Number: 5,614,465
[45] Date of Patent: Mar. 25, 1997

[54] METHOD OF MAKING A COLOR FILTER ARRAY BY THERMAL TRANSFER

[75] Inventors: Michael E. Long, Bloomfield; Helmut Weber, Webster; Nancy J. Armstrong, Ontario; Michael L. Boroson, Rochester; Kathleen S. Hollis, Dalton, all of N.Y.

[73] Assignee: Eastman Kodak Company, Rochester, N.Y.

[21] Appl. No.: 672,167

[22] Filed: Jun. 25, 1996

[51] Int. Cl.⁶ ............................. B41M 5/035; B41M 5/38
[52] U.S. Cl. ..................... 503/227; 359/892; 428/195; 428/210; 428/913; 428/914; 430/4; 430/321; 349/106
[58] Field of Search .................... 359/68, 892; 428/195, 428/210, 913, 914; 430/4, 321; 503/227

[56] References Cited

U.S. PATENT DOCUMENTS

| | | | |
|---|---|---|---|
| 4,081,277 | 3/1978 | Brault et al. | 96/38 |
| 4,541,830 | 9/1985 | Hotta et al. | 8/471 |
| 4,695,286 | 9/1987 | Vanier et al. | 8/471 |
| 4,695,287 | 9/1987 | Evans et al. | 8/471 |
| 4,698,651 | 10/1987 | Moore et al. | 503/227 |
| 4,701,439 | 10/1987 | Weaver et al. | 503/227 |
| 4,740,797 | 4/1988 | Yamanoto et al. | 346/74.4 |
| 4,743,582 | 5/1988 | Evans et al. | 503/227 |
| 4,753,922 | 6/1988 | Byers et al. | 503/227 |
| 4,757,046 | 7/1988 | Byers et al. | 503/227 |
| 4,769,360 | 9/1988 | Evans et al. | 503/227 |
| 4,775,657 | 10/1988 | Harrison et al. | 503/227 |
| 4,923,860 | 5/1990 | Simons | 503/227 |
| 4,957,898 | 9/1990 | Weber | 503/227 |
| 4,962,081 | 10/1990 | Harrison et al. | 503/227 |
| 4,973,572 | 11/1990 | DeBoer | 503/227 |
| 4,975,410 | 12/1990 | Weber et al. | 503/227 |
| 4,988,665 | 1/1991 | Weber et al. | 503/227 |
| 5,143,754 | 9/1992 | Long et al. | 427/335 |
| 5,162,291 | 11/1992 | Long et al. | 503/227 |
| 5,166,126 | 11/1992 | Harrison et al. | 503/227 |
| 5,229,232 | 7/1993 | Longobardi et al. | 430/7 |

FOREIGN PATENT DOCUMENTS

| | | | |
|---|---|---|---|
| 2130781 | 2/1983 | United Kingdom | G09G 3/36 |
| 2154355 | 1/1985 | United Kingdom | G09G 3/36 |
| 2161971 | 1/1986 | United Kingdom | H01L 29/76 |
| 2162674 | 2/1986 | United Kingdom | G09G 3/36 |

*Primary Examiner*—Bruce H. Hess
*Attorney, Agent, or Firm*—Raymond L. Owens

[57] ABSTRACT

A method of producing a color filter array on a transparent support, includes the steps of: forming a polymer image-receiving layer on the transparent support; baking the polymer image-receiving layer on the transparent support so as to harden the polymer image-receiving layer; and imagewise thermally transferring different colorants to form multicolored pixels in the polymer image-receiving layer. The method further includes fixing the colorant pixels into the polymer receiving layer to form the color filter array; and coating the such formed color filter array with an overcoat.

6 Claims, 2 Drawing Sheets s one the most cosily components of the liquid crystal display. One promising method to reduce the cost of color filter array manufacture while still maintaining the required quality is by use of thermal dye transfer method as discussed in commonly-assigned U.S. Pat. Nos. 4,923,860 and 5,229,232. In the method described therein, the color filter array is formed by thermally transferring dye to a receiver coated support from a dye donor by use of a mask and a high intensity flash system.

METHOD OF MAKING A COLOR FILTER ARRAY BY THERMAL TRANSFER

CROSS REFERENCE TO RELATED APPLICATION

Reference is made to commonly-assigned U.S. application Ser. No. 08/586,105 filed Jan. 16, 1996, entitled "Method of Making Black Matrix Grid Lines for A Color Filter Array" by DeBoer et al, the teachings of which are incorporated herein by reference.

FIELD OF THE INVENTION

This invention relates to a method of making a color filter array element on a transparent substrate by thermal transfer.

BACKGROUND OF THE INVENTION

Liquid crystal display devices are known for digital display in electronic calculators, clocks, household appliances, audio equipment, etc. Liquid crystal displays are being developed to replace cathode ray tube technology for display terminals. Liquid crystal displays occupy a smaller volume than cathode ray tube devices with the same screen area. Also, they are lighter than cathode ray tubes, and are therefore useful in portable device displays such as lap-top computers. In addition, liquid crystal display devices usually have lower power and lower voltage requirements than corresponding cathode ray tube devices.

One commercially available type of color filter array element that has been used in liquid crystal display devices for color display capability is a transparent support having a gelatin layer thereon which contains dyes having the additive primary colors red, green and blue in a mosaic pattern obtained by a photolithographic technique. To prepare such a color filter array element a gelatin layer is sensitized, exposed to a mask for one of the colors of the mosaic pattern, developed to harden the gelatin in the exposed areas, and washed to remove the unexposed (uncrosslinked) gelatin, thus producing a pattern of gelatin which is then dyed with dye of the desired color. The element is then recoated and the above steps are repeated to obtain the other two colors. Misalignment or improper deposition of color materials may occur during any of these operations. Further details of this process are disclosed in commonly-assigned U.S. Pat. No. 4,081,277.

Color liquid crystal display devices generally include two spaced glass panels which define a sealed cavity that is filled with a liquid crystal material. For actively-driven devices, a transparent electrode is formed on one of the glass panels, which electrode may be patterned or not, while individually addressable electrodes are formed on the other of the glass panels. Each of the individual electrodes has a surface area corresponding to the area of one picture element, or pixel. If the device is to have color capability, each pixel must be aligned with a color area, e.g. red, green, or, blue, of a color fiber array. Depending on the image to be displayed, one or more of the pixel electrodes is energized during display operation to allow full light, no light, or partial light to be transmitted through the color filter area associated with that pixel. The image perceived by a user is a blending of colors formed by the transmission of light through adjacent color filter areas.

Obviously, in the display of high quality images, the quality of the color filter array is quite important. Unfortunately, the cost of such color filter arrays is quite high and

SUMMARY OF THE INVENTION

It is the object of this invention to provide a method of producing color filter array elements at a substantially fewer steps than is used in the art.

This object is achieved in a method of producing a color filter array on a transparent support, comprising:

a) forming a polymer image-receiving layer on the transparent support;

b) baking the polymer image-receiving layer on the transparent support so as to harden the polymer image-receiving layer;

c) imagewise thermally transferring different colorants to form multicolored pixels in the polymer image-receiving layer;

d) fixing the colorant pixels into the polymer receiving layer to form the color filter array; and e) coating the such formed color filter array with an overcoat.

It is an advantage of the present invention to provide a simplified method of making color filter arrays with fewer steps thereby providing for a cost reduced method.

Another advantage of the present is that the present method is particularly suitable for forming color filter arrays which can be used in liquid crystal display devices.

DETAILED DESCRIPTION OF THE INVENTION

Figure 1:
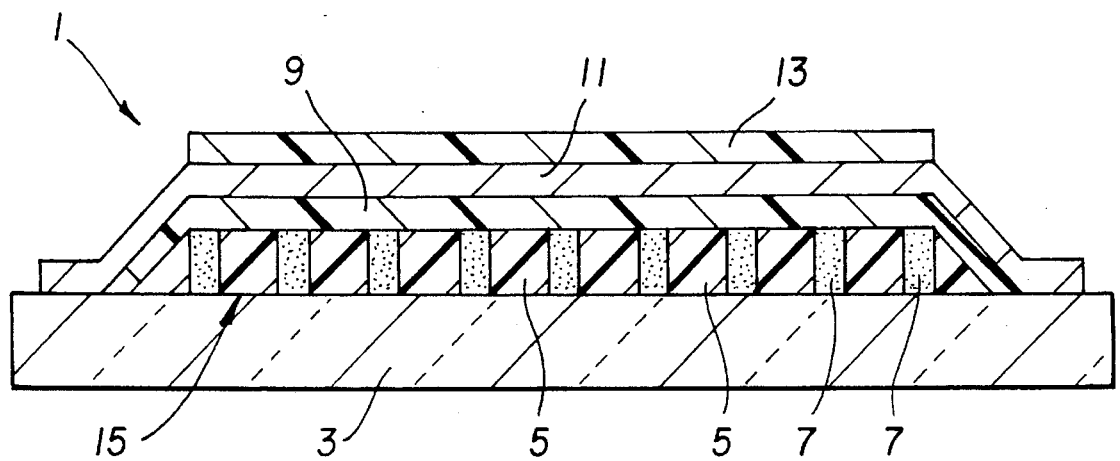
FIG. 1 is a cross-sectional view of a color filter array made in accordance with the present invention.

A useful color filter array should have good thermal resistance, so that subsequent high temperature processing steps such as vacuum sputtering of conducting layers and curing of polymeric alignment layers will not degrade the color quality of the pixel elements of the array. The colorants of the pixel elements of the array should also be chosen to have good fade resistance to the viewing light that illuminates them. The colorants must have good color purity, and the overall transmissivity of the color filter array should be as high as possible, consistent with good color purity and saturation, so that the power of the illuminating lamp need not be excessively high. Additional requirements on the color fiber array are that the resolution of the array be high, so that the images appear sharp and detailed to the eye, and the overall uniformity of the image be good. In addition, point defects such as missing pixels (pixel drop-outs) must not occur in a uniform array image.

As noted above, the image-receiving layer contains a repeating pattern of colorants, and in a preferred embodiment of the invention, the mosaic pattern consists of a set of red, green, and blue additive primaries.

In another preferred embodiment of the invention, each area of primary color and each set of primary colors are separated from each other by an opaque area, e.g., black grid lines. This has been found to give improved color reproduction and reduce flare in the displayed image, and protect photosensitive electronics from light.

The size of the colored pattern set is not critical since it depends on the viewing distance. In general, the individual pixels of the set are from about 50 to about 60 microns and do not have to be of the same size.

In a preferred embodiment of the invention, the repeating mosaic pattern of colorant to form the color filter array element consists of uniform, square, linear repeating areas as follows:

| | | | | | |
|---|---|---|---|---|---|
| B | R | G | B | R | G |
| B | R | G | B | R | G |
| B | R | G | B | R | G |

The color filter array elements prepared according to the invention can be used in image sensors or in various electro-optical devices such as electroscopic light valves or liquid crystal display devices. Such liquid crystal display devices are described, for example, in U. K. Patents 2,154,355; 2,130,781; 2,162,674; and 2,161,971.

Liquid crystal display devices are commonly made by placing a material, which is liquid crystalline at the operating temperature of the device, between two transparent electrodes, usually indium tin oxide coated on a substrate such as glass, and exiting the device by applying a voltage across the electrodes. Alignment layers are provided over the transparent electrode layers on both substrates and are treated to orient the liquid crystal molecules in order to introduce a twist of, e.g., 90°, between the substrates. Thus, the plane of polarization of plane polarized light will be rotated in a 90° angle as it passes through the twisted liquid crystal composition from one surface of the cell to the other surface. Application of an electric field between the selected electrodes of the cell causes the twist of the liquid crystal composition to be temporarily removed in the portion of the cell between the selected electrodes. By use of optical polarizers on each side of the cell, polarized light can be passed through the cell or extinguished, depending on whether or not a electric field is applied.

The polymeric alignment layer described above can be any of the materials commonly used in the liquid crystal art. Examples of such materials include polyimides, polyvinyl alcohol, and methyl cellulose.

The transparent conducting layer described above is also conventional in the liquid crystal art. Examples of such materials include indium tin oxide, indium oxide, tin oxide, and cadmium stannate.

FIG. 1 shows a cross sectional schematic of a color filter array 1 made in accordance with the present invention which can be used in a liquid crystal display device (not shown). The color filter array 1 includes a rigid transparent support 3 formed of glass, plastic, or other suitable material. The color filter array 1 includes red (R), green (G), and blue (B) color cells or pixels cells 5 embedded in a polymer-image receiving layer 15. It will be understood to those skilled in the art that other colors, such as cyan, magenta and yellow can also be used. Black grid lines 7 separate each color pixel. The color filter array 1 has a polymeric protective overcoat layer 9 and also can be coated with a transparent conducting layer of suitable material such as indium tin oxide (ITO) 11. When used in a liquid crystal device (LCD) an alignment layer 13 is used.

First, the rigid transparent support 3 is cleaned by mechanical scrubbing, ultrasonic bath, megasonic bath, dump rinse, plasma treatment or the like. Usually, a combination of cleaning steps are used with a variety of solvents and solutions such as water, water and surfactant, water and soap, alcohols, hydrocarbons, acids.

In order apply a black matrix for the purposes described above, the rigid transparent support is then coated with highly opaque material such as chromium, chrominium oxide, or a combination thereof, and subsequently patterned photolithographically. For a more complete disclosure of a black matrix system, see commonly assigned U.S. application Ser. No. 08/586,105 filed Jan. 16, 1996 by DeBoer et at.

The polymer image-receiving layer 15 can be formed from, for example, those polymers described in commonly-assigned U.S. Pat. Nos. 4,695,286; 4,775,657; and 4,962,081, or a mixture thereof the disclosures of which are hereby incorporated by reference. The polymer image-receiving layer 15 can be applied by printing or coating or other techniques commonly in used the art such as, but not limited to, spin coating, curtain coating, hopper coating, capillary coating, meniscus coating, screen printing, ink jet, and spray coating. In a preferred embodiment, the polymer image-receiving layer 15 is applied by screen printing as described fully in commonly-assigned U.S. Pat. No. 5,079,214, the disclosures of which are hereby incorporated by reference.

In another preferred embodiment, polycarbonates having a glass transition temperature greater than about 200° C. are employed as the polymer image-receiving layer 15. Polycarbonates derived from a methylene substituted bisphenol A such as 4,4'-(hexahydro-4,7-methanoindan-5-ylidene)-bisphenol have been employed. In general, good results have been obtained at a coverage of from about 0.25 to about 5 $mg/m^2$.

The polymer coated rigid transparent support 3 is then baked by heating to remove solvents from the polymer coated rigid transparent support 3 to permit convenient handling of the support. This heating can be done either on a hot plate or in an oven. Optimal times are from 10 seconds to 10 minutes and preferred temperatures for 40° C. to 250° C.

The colorants used in the color filter array 1 of the invention may include pigments, dyes, or dichroic layers which are colored by virtue of the interference cancellation of certain wavelengths of light.

Figure 2:
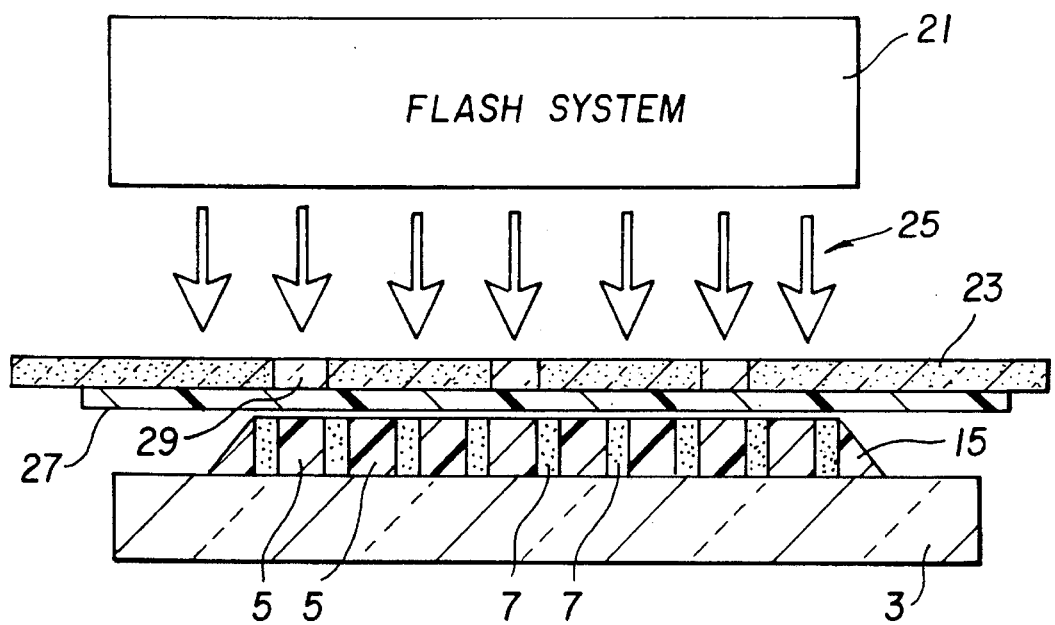
FIG. 2 shows a step in the process of making the color filter array of FIG. 1 wherein colored pixels are being formed in the polymer image-receiving layer.

Turning now to FIG. 2, a dye-donor element, 27, is used to form the color filter array 1 of a preferred embodiment of the invention includes a support having thereupon a dye layer. Any dye or mixtures of dyes can be used in such a layer provided they are transferable to the dye image-receiving layer of the color filter array element of the invention by the action of intense light. Especially good results have been obtained with sublimable dyes. Examples of sublimable dyes include anthraquinone dyes, e.g. Sumikalon Violet RS® (Sumito Chemical Co., Ltd.); Dianix Fast Violet 3R-FS® (Mitsubishi Chemical Industries, Ltd.); and Kayalon Polyol Brilliant Blue N-BGM®; Kayalon Polyol Dark Blue 2BM®; and KST Black KR® (Nippon Kayaku Co., Ltd.); Sumickaron Diazo Black 5G® (Mitsui Toatsu Chemicals, Inc.); direct dyes such as Direct Dark Green B® (Mitsubishi Chemical Industries, Ltd.); and Direct Brown M® and Direct Fast Black D® (Nippon Kayaku Co., Ltd.); acid dyes such as Kayanol Milling Cyanine 5R® (Nippon Kayaku Co., Ltd.); basic dyes such as Sumicacryl Blue 6G® (Sumitomo Chemical Co., Ltd.); and Aizen Malachite Green® (Hodogaya Chemical Co., Ltd.); or any of the dyes disclosed in commonly-assigned U.S. Pat. Nos. 4,698,651; 4,695,287; 4,701,439; 4,757,046; 4,743,582; 4,769,360; and 4,753,922, the disclosures of which are hereby incorporated by reference.

Suitable dyes are further illustrated by the following structural formulae:

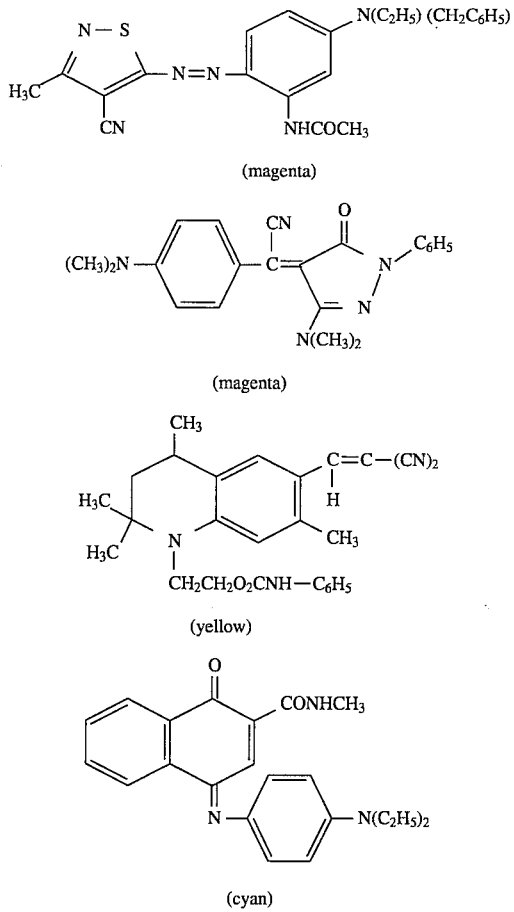

The above subtractive dyes can be employed in various combinations to obtain the desired red, blue, and green additive primary colors, as disclosed in commonly-assigned U.S. Pat. Nos. 4,957,898; 4,975,410; and 4,988,665, the disclosures of which are hereby incorporated by reference. The dyes can be mixed within the dye layer or transferred sequentially if coated in separate dye layers and can be used at a coverage of from about 0.05 to about 1 g/m2.

Various methods can be used to transfer dye from the dye donor element 27 to form the pixels in the polymer image-receiving layer, 15 to make the color filter array 1 of the invention. For example, a high intensity light flash from a xenon filled flash lamp can be used with a dye-donor containing an energy absorptive material such as carbon black or a light-absorbing dye. This method is more fully described in commonly-assigned U.S. Pat. No. 4,923,860, the disclosure of which is incorporated herein by reference.

FIG. 2 shows schematically an apparatus for imagewise transfer the dyes into the polymer image-receiving layer 15. A flash system 21 illuminates a mask 23, which imagewise discriminates the impinging radiation 25 onto the dye donor element 27. The mask 23 can be, but is not limited to, chromium on glass such as is common in the art. The radiation 25 passes through the transparent regions 29, in the mask 23, illuminates the dye donor element 27, is absorbed in the dye layer, heats the donor imagewise, and causes dye to transfer to polymer image-receiving layer 15. Preferably, the same mask 23 can be used in the sequential process of forming different colored pixels. If it is used then of course it would have to moved laterally to form the next set of thermal pixels of a different color. See commonly-assigned U.S. Pat. No. 5,229,232.

Figure 3:
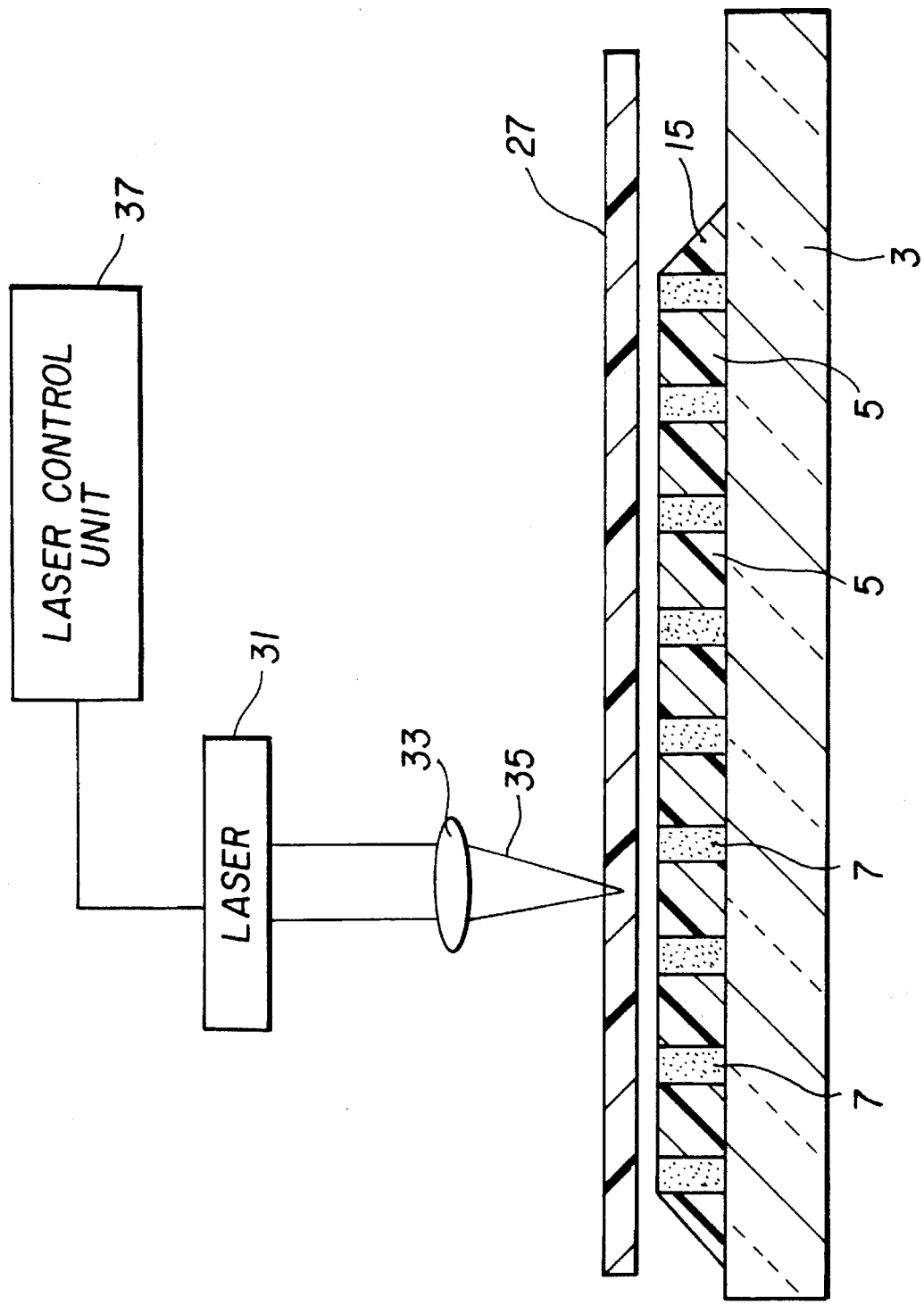
FIG. 3 shows in schematic form a step in the process of forming pixels in the color filter array by using laser light.

In another embodiment of the invention, the high intensity light is supplied by means of a laser, using a dye-donor element comprising a support having thereon a dye layer and an absorbing material for the wavelength of the laser. FIG. 3 shows the practice of such an apparatus. In this arrangement, the light emission, 35, of a laser, 31, is focused by lens or optical system 33 onto the dye-donor element 27. The intensity and movement of the laser and the transparent support is controlled by the laser control unit 37 in such a manner as to produce dye pixels of the appropriate color in the appropriate location.

Any material that absorbs the laser energy or high intensity light flash described above can be used as the absorbing material, for example, carbon black or non-volatile infrared-absorbing dyes or pigments which are well known to those skilled in the art. In a preferred embodiment, cyanine infrared absorbing dyes are employed as described in commonly-assigned U.S. Pat. No. 4,973,572, the disclosure of which is hereby incorporated by reference.

Irrespective of whether laser or flash lamps are employed to transfer the dye from the donor to the polymeric image-receiving layer, the intensity of the radiation should be high enough and the duration of the flash should be short enough that there is no appreciable heating of the assembly with concomitant significant dimension change in the pattern of color cell or pixel cells 5. In this invention, the preferred duration of flash is from 1 microsecond to 30 milliseconds. The preferred intensity of the flash is from 0.01 Watts per square micrometer to 10 Watts per square micrometer.

Fusing provides a method in which the thermally transferred dyes as described above, are fixed or dissolved into the polymer image-receiving layer 15. This can be achieved by any solvent which will dissolve the dye receiver layer and the dye layer. Both solvent vapor concentration and exposure time of the dye receiver layer to the solvent important for achieving effective fusing of the dye into the receiver layer. Effective fusing is characterized by complete fixing of the dye into the receiver layer with no significant distortion of the dye image. The dye must be fixed to an extent such that no significant quantity of dye can be removed from the surface of the receiver layer when washed with a solvent capable of dissolving on the dye. The fusing step is described in commonly-assigned U.S. Pat. Nos. 5,162,291 and 5,143,754 the disclosures of which is incorporated herein by reference.

When solvents are used, the polymer coated rigid transparent support 3 is again heated to remove solvents from the fusing method. This heating can be done either on a hot plate or in an oven. Optimal times are from 10 seconds to 10 minutes and temperatures for 40° C. to 250° C.

This surface may then be coated with any required protective overcoat, followed by the transparent electron layer and the polymeric alignment layer. In the color filter array of the invention the polymeric protective overcoat layer 9, which overlies the image-receiving layer that contains the colorant of the pixel elements, may be formed by photopolymerizing a layer containing a cycloaliphatic epoxide compound such as 3,4-epoxycylohexylmethyl-3,4- epoxycylohexylcarboxylate, and an onium salt of a Lewis acid as a photoinitiator, as more fully described in commonly-assigned U.S. Pat. No. 5,166,126 the disclosure of which is incorporated herein by reference.

The invention has been described in detail with particular reference to certain preferred embodiments thereof, but it will be understood that variations and modifications can be effected within the spirit and scope of the invention. In the above discussion, thermally transferred dyes were used, although other colorants such as, for example, pigments, or dichroic layers as discussed above.

PARTS LIST 1 color filter array
3 rigid transparent support
5 color cells or pixel cells
7 black grid lines
9 polymeric protective overcoat layer
11 ITO
13 alignment layer
15 polymer image-receiving layer
21 flash system
23 mask
25 radiation
27 dye donor element
29 transparent regions
31 laser
33 lens or optical system
35 light emission
37 laser unit

We claim:

1. A method of producing a color filter array on a transparent support, comprising:

a) forming a polymer image-receiving layer on the transparent support;

b) baking the polymer image-receiving layer on the transparent support so as to harden the polymer image-receiving layer;

c) imagewise thermally transferring different colorants to form multicolored pixels in the polymer image-receiving layer;

d) fixing the colorant pixels into the polymer receiving layer to form the color filter array; and e) coating the such formed color filter array with an overcoat.

2. The method of claim 1 wherein the transparent support is selected from the group consisting of quartz, borosilicate, and sodalime.

3. The method of claim 2 wherein the transparent support includes a black matrix of chromium.

4. The method of claim 1 wherein the baking step is on a hot plate or in an oven at a temperature in the range of 40° C. to 300° C., at a time in the range of between 10 seconds to 15 minutes.

5. The method of claim 1 wherein the fixing step is baking on a hot plate, radiant heating, or in an oven at a temperature in the range of 40° C. to 300° C., at a time in the range of between 10 seconds to 15 minutes.

6. The method of claim 1 wherein the fixing step is solvent fusing followed by baking on a hot plate, radiant heating, or in an oven at a temperature in the range of 40° C. to 300° C., at a time in the range of between 10 seconds to 15 minutes.

* * * * *